June 2, 1942.  R. G. GRISWOLD ET AL  2,284,732
ENGINE SUPERCHARGING
Filed Nov. 12, 1938  3 Sheets-Sheet 1
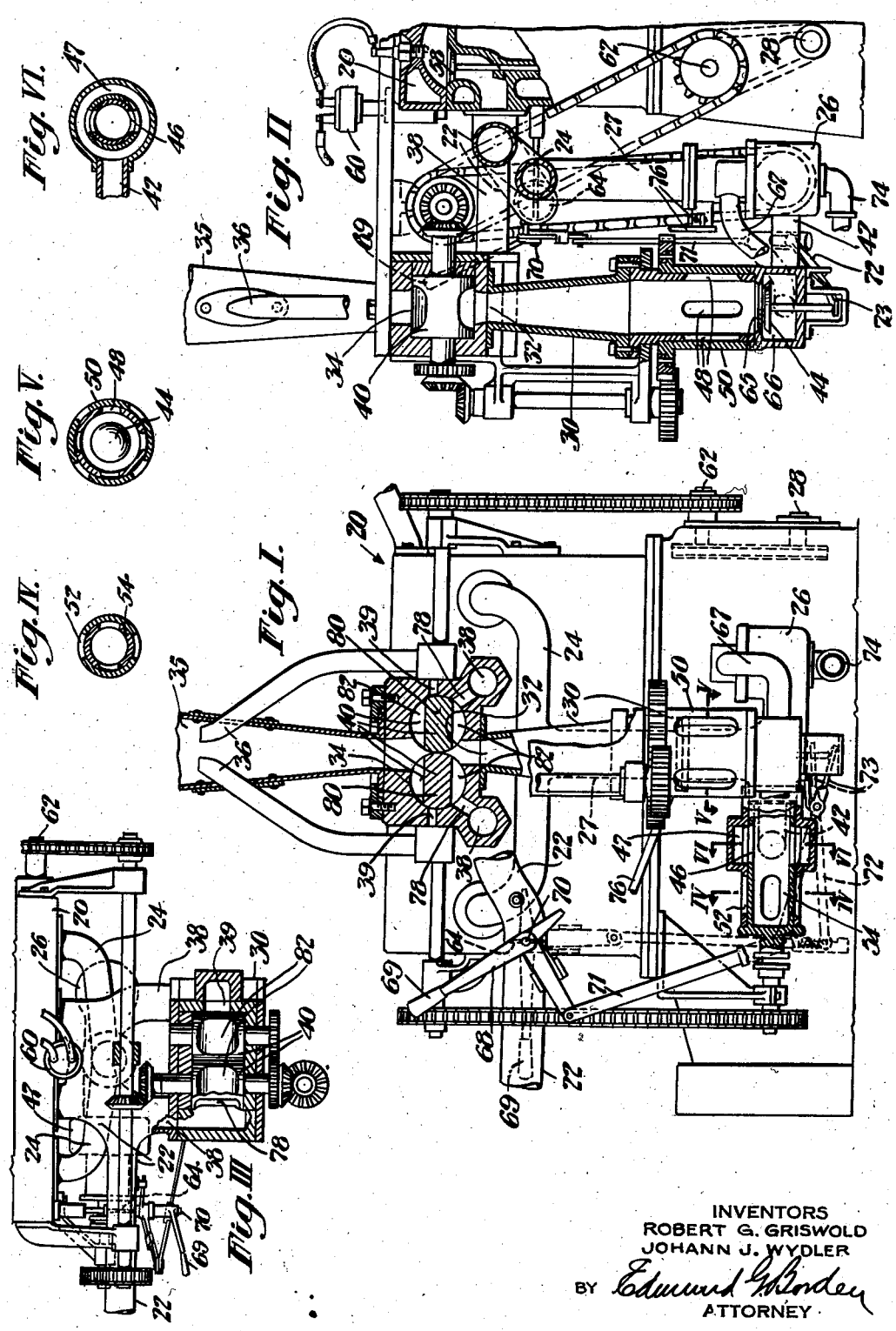
INVENTORS
ROBERT G. GRISWOLD
JOHANN J. WYDLER
BY Edmund G. Borden
ATTORNEY

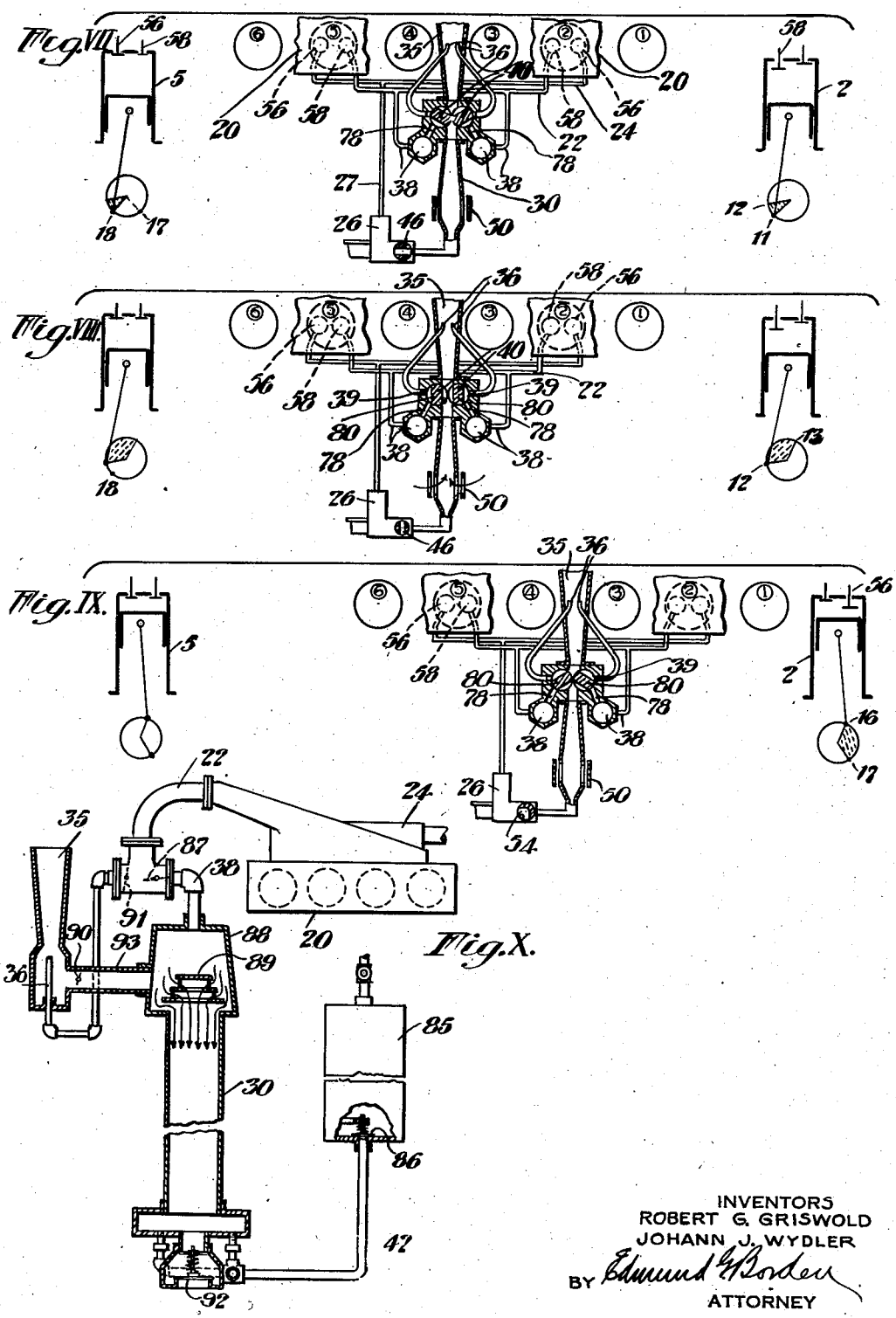

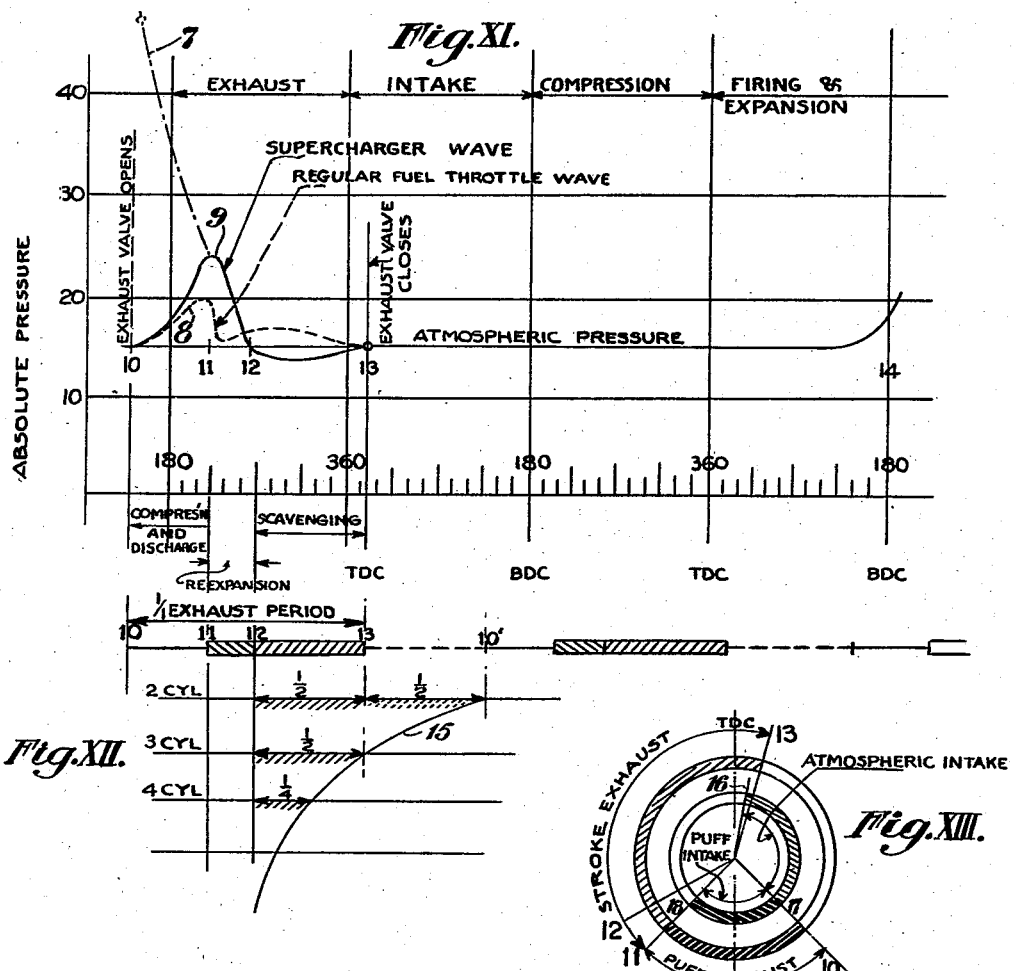
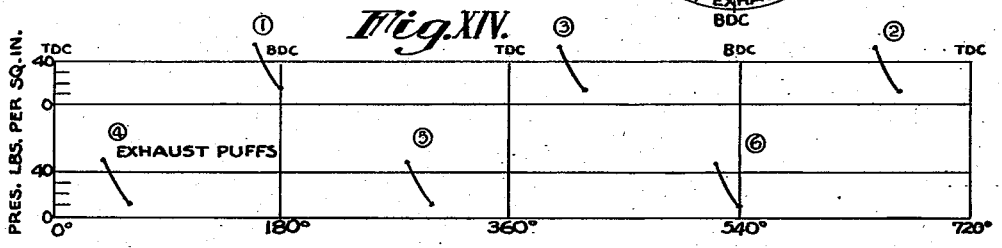
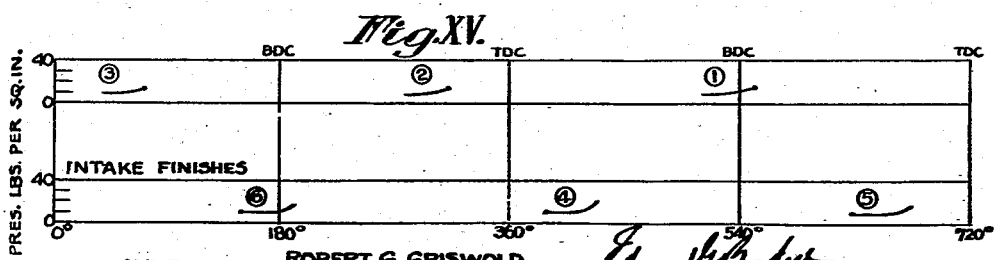

Patented June 2, 1942

2,284,732

UNITED STATES PATENT OFFICE 2,284,732

ENGINE SUPERCHARGING

Robert G. Griswold and Johann J. Wydler, Westfield, N. J., assignors, by mesne assignments, to Cities Service Oil Company, New York, N. Y., a corporation of Pennsylvania Application November 12, 1938, Serial No. 240,014

19 Claims. (Cl. 123—2)

This invention relates to internal combustion engines, and more particularly to an improved method of and apparatus for deriving energy from engine exhaust gases and using such energy for compressing air for supercharging the engine.

The power output of an internal combustion engine per cubic inch of piston displacement can be increased by supercharging, i. e., by introducing the combustion air into the cylinder in precompressed condition. Moreover the power output of an internal combustion engine can be considerably increased by converting some of the energy normally carried out of the engine by the exhaust gases into useful work, as by means of an exhaust gas turbine. Turbo-compressors of various types have been heretofore developed in which air for supercharging an internal combustion engine is compressed by means of power developed by a turbine actuated by the hot exhaust gas discharged by the engine. However, the high temperature of the exhaust gas creates major thermodynamic and mechanical problems in the design and operation of exhaust gas turbines.

A primary object of the present invention is to provide an improved method of and apparatus for increasing the power output and the efficiency of an internal combustion engine.

A more particular object is to provide improved method and apparatus for deriving energy from engine exhaust gases and using such energy for compressing air or other gas in an efficient manner, i. e., with minimum waste of energy and minimum mechanical difficulty.

When the exhaust manifold of an internal combustion engine is coupled directly to the inlet nozzle of the usual exhaust gas turbine, the power output of the engine is reduced substantially in proportion to the back pressure resistance to the movement of the piston which is created by the nozzle of the turbine.

Another object of the present invention is to provide method of and apparatus for deriving energy from engine exhaust gases without developing substantial back pressure resistance to the movement of the engine pistons.

The gas exhaust period of the cycle of any internal combustion engine cylinder consists of two parts. During the first part of the exhaust period just after the exhaust valve has been opened, a substantial proportion (roughly 50%) of the total volume of gas in the cylinder is rapidly discharged as a high pressure "puff" wave moving outwardly from the cylinder into the exhaust manifold at high initial pressure and at high velocity. During the latter part of the exhaust period the remaining portion of the exhaust gases leaves the cylinder under a relatively low pressure head and moderate velocity in front of the advancing piston, this period of the cycle being referred to as the "stroke" period of the exhaust. It is only during the stroke period of the exhaust that back pressure may interfere markedly with the movement of the engine piston.

Essentially the present invention resides chiefly in the use of a displacement compressor as the medium for compressing air by means of energy carried by the exhaust gases. In this displacement compressor the pressure energy of the first puff discharge wave of exhaust gases is transmitted directly to the air to be compressed, with substantially 100% energy conversion efficiency. This displacement compressor might be termed a gas piston pump, or in other words a compressor in which the air is compressed and discharged by a wave of hot exhaust gases moving forward in direct contact with and displacing the air in the pump chamber. The displacement compressor therefore operates on the well known wave propagation principle that when two bodies of gases are introduced successively into a chamber, a second body of gas introduced last into the chamber at one end thereof at higher pressure under conditions avoiding substantial turbulence tends to maintain itself in a separate stratified layer while displacing and compressing the lower pressure gas originally occupying the end of the chamber at which the second gas is introduced.

Another feature of the invention is the provision of apparatus whereby one of the cylinders of a multi-cylinder four cycle internal combustion engine may be supercharged by an efficient displacement air compression operation deriving its energy from the coinciding hot exhaust gas pressure wave discharged from another cylinder of the engine.

A particular feature of the displacement compressor element of the present invention is that its operating cycle includes a displacement period wherein air is compressed and pushed out of the compressor by exhaust gases introduced thereto during the first or puff discharge period of an engine cylinder exhaust cycle; while during the latter part of the compressor's operating cycle the puff exhaust gases are discharged from the compressor and the compressor is scavenged with air by means of energy derived from the exhaust gases discharged from the engine cylinder during the stroke part of the cylinder exhaust cycle.

Another feature of the invention is that the displacement compressor design embodies both atmospheric and pressure air delivery ports and control valves whereby either atmospheric air or compressed air may be supplied to the carbureter and intake manifold of the engine with which the compressor is operatively associated.

In the operation of a multi-cylinder engine, as for example, a six cylinder four cycle engine, the exhaust puffs of the six cylinders follow each other at intervals of 120° crank angle travel, and produce pressure waves in the exhaust manifold of the same period. Thus in a single exhaust manifold the exhaust puff from one cylinder may create a back pressure interfering with the scavenging process of another cylinder immediately preceding it in line of firing order. According to the present invention it is contemplated that a multi-cylinder engine shall be provided with a sufficient number of exhaust manifolds and air compressing units to insure that the exhaust puff waves in any manifold shall not follow each other at intervals shorter than 180° crank angle. It is also contemplated that the introduction of compressed supercharge air to a cylinder shall only take place during the last portion of the air intake period. During the first part of the air intake period for each cylinder air is supplied at atmospheric pressure. Accordingly the supercharger need only be of small capacity, and can be assembled in closely spaced relation to the engine with short air and gas transfer connections.

With the above and other objects and features in view, the invention consists in the improved method of and apparatus for compressing air and supercharging an internal combustion engine which is hereinafter described and more particularly defined by the accompanying claims.

The invention will hereinafter be described with particular reference to the accompanying drawings, in which:

Fig. I is a front elevation of a preferred design of internal combustion engine-air supercharger assembly in accordance with the present invention, parts of the assembly being shown in vertical section;

Fig. II is a view in side elevation, with parts in vertical section, showing the engine-supercharger assembly of Fig. I;

Fig. III is a top plan view of the engine-supercharger assembly, with the top of the supercharger shown in horizontal section, through the hot gas transfer control valves.

Fig. IV is a vertical sectional view of the engine atmospheric air intake ports and control valve, taken on the line IV—IV of Fig. I;

Fig. V is a horizontal sectional view of the atmospheric air intake ports and control valve of the supercharger, taken on the line V—V of Fig. I;

Fig. VI is a vertical sectional view of the compressed air transfer ports and control valve therefor, taken on the line VI—VI of Fig. I;

Fig. VII is a diagrammatic view illustrating the hookup of two cylinders of a six-cylinder engine to the supercharger element, with the supercharger hot gas transfer valves in the position assumed at the beginning of the period of hot gas exhaust from the supercharger;

Fig. VIII is also a diagrammatic view of the same apparatus elements shown in Fig. VII, showing the position of the hot gas transfer valves during the period in which atmospheric air is admitted to the supercharger to scavenge the supercharger preliminary to a new compression period;

Fig. IX is a diagrammatic view of the same apparatus elements shown in Figs. VII and VIII showing the position assumed by the hot gas transfer valves and by an atmospheric air intake valve during the period when air from atmosphere is entering the intake manifold of the engine, with the supercharger inactive;

Fig. X is a diagrammatic view of a modified assembly of a multi-cylinder internal combustion engine and gas displacement compressor adapted to utilize the energy of a plurality of cylinder exhaust discharges for compressing air, and to thereafter use energy of the gas discharges from the same engine cylinders for scavenging the compressor with a fresh supply of air.

Fig. XI is a pressure-time graph illustrating the variations in pressure energy of the hot exhaust gas discharged from an engine cylinder; the dotted curve representing the full throttle pressure wave normally developed in the engine exhaust manifold over the period of cylinder exhaust; and the full line curve representing the exhaust pressure wave developed within a supercharger to which the exhausting cylinder is connected in accordance with the present invention;

Fig. XII is a graph illustrating the varying length of time available for the operating cycle of one supercharger unit when it is operatively connected respectively with two, three and four cylinders of a four cycle internal combustion engine.

Fig. XIII is a polar diagram illustrating in concentrically arranged ring sections the intake and exhaust periods of two cylinders of a four cycle engine operating on working cycles phased 360° apart;

Fig. XIV plots curves each of which is a linear pressure-time graph of the initial exhaust puff discharge of one of the cylinders of a six-cylinder four cycle internal combustion engine; and Fig. XV plots curves each of which is a linear pressure-time graph of the finish of the air intake period of one of the cylinders of the same six-cylinder engine considered in Fig. XIV.

The preferred apparatus assembly of the present invention, as illustrated in Figs. I to IX inclusive, includes a multi-cyclinder internal combustion engine 20 and a displacement air compressor 30 operatively connected for compressing air at the expense of energy derived from the engine exhaust gases and utilizing the compressed air for supercharging the engine. In its broadest scope, however, the invention is not limited to the use of the compressed air for engine supercharging.

In Fig. VII the cylinders of a six-cylinder four cycle engine 20 have been numbered respectively 1, 2, 3, 4, 5, and 6, and cylinders 2 and 5 have been shown as operatively connected to a supercharger unit 30. Referring to Figs. XIV and XV, it will be noted that while cyilnder 4 is starting its gas exhaust, cylinder 3 is finishing its air intake. Likewise while cylinder 1 is starting its gas exhaust, cylinder 6 is finishing its air intake. Likewise while cylinder 5 is starting its gas exhaust, cylinder 2 is finishing its air intake. In other words the cylinders of a multi-cylinder engine must be paired in practicing the preferred supercharging operation of this invention, so that the energy carried by the exhaust gas discharged from one cylinder of a pair can be utilized for compressing the air introduced into another cylinder at the end of its intake period. The pistons in each cylinder of a pair, such as 2 and 5, pass simultaneously through their top and bottom dead center positions. However, the power strokes of the pistons are 360° crank angle apart in phase.

Each cylinder of the two cylinder engine of Fig. I is illustrated as connected to discharge waste combustion gases into an exhaust manifold 22, and each of the engine cylinders is also connected to receive a supply of air and fuel from an intake manifold 24. The air and fuel supplies for the engine are mixed in a carbureter 26, and the air-fuel mixture is conducted from the carbureter to the intake manifold through a riser pipe 27. Power developed by the engine 20 is primarily transmitted through a main engine crank shaft 28.

The supercharger 30 is preferably cylindrical in cross section and has a length several times its maximum internal diameter. Moreover, the supercharger preferably has an internal cubic capacity only sufficient to handle the volume of hot gas discharged from a single engine cylinder during the first puff portion of the exhaust, and to compress only the air with which the cylinder is supercharged at the end of its air intake period. That end of the supercharger 30 into which hot exhaust gases are admitted from the manifold 22 is preferably designed as a Venturi throat 32 within a valve chamber 34. Beyond the throat 32 there is a funnel-shaped gas discharge pipe 35 within which are mounted one or more aspirator pressure nozzles 36. Hot gas transfer passages and conduits 38 serve to communicably connect the engine exhaust manifold 22 and the valve chamber 34. Twin abutting cylindrical valves 40 are rotatably mounted in the valve chamber in position to communicably connect and disconnect the transfer passages 38 either with the interior of supercharger 30, or with the aspirator nozzles 36 by way of transfer passages 39.

Air which is compressed in supercharger 30 is transferred from the base of the supercharger to the carbureter 26 by way of a transfer line 42, the inlet to which is primarily controlled by a valve 44. An additional hollow rotary valve 46 operates to regulate admission of compressed air from the transfer line 42 into the carburetor 26. Air may enter the supercharger from atmosphere through a plurality of annular ports 48 in the lower walls of the supercharger, such ports being thrown into and out of register with the outside atmosphere by means of a hollow rotary apertured valve 50. When the valve 44 is closed and the supercharger inactive, atmospheric air may still be passed to the carbureter and engine by means of atmospheric air inlet ports 52 which are opened and closed by a hollow rotary valve 54.

The engine itself (Figs. II and VII) is equipped with air and fuel inlet valves 56 and exhaust valves 58. Combustion within any engine cylinder is initiated by means of a spark plug, the timing of which is controlled by a distributor 60. The distributor 60 and also the valves 56 and 58 are actuated from the engine through a cam shaft 62. Cam shaft 62 operates at half the speed of the engine crank shaft 28. Valves 40, 46, 50, and 54 are also actuated from the cam shaft 62 through suitable drive mechanism, as illustrated.

To permit the engine to be operated without the supercharger, a butterfly valve 64 is mounted in the exhaust manifold 22. With this valve open the engine cylinders are exhausted directly through manifold 22 to atmosphere, while with this valve closed the hot engine exhaust gases are forced to pass through the hot gas transfer line 38 either to the supercharger or to the aspirator. Any hot exhaust gas which is admitted to the supercharger 30 is ultimately exhausted to atmosphere past the valves 40 and through pipe 35.

The valves 46 and 54 (Figs. I, IV and VI) are hollow cylindrical valves rotatably journaled in a cylindrical housing which forms an extension of the air intake port of carbureter 26. Valve 54 is provided with wall apertures which are brought into and out of register with apertures 52 in the housing, thereby controlling admission of atmospheric air to the carbureter through the interior of the valve. Apertures in the walls of valves 46 and 54 are located so that the valves open in sequential phase. The apertures in valve 46 on rotation of the valve communicably connect and disconnect the interior of the valve with an annular chamber 47 which constitutes an enlargement of the conduit 42 at the carbureter end of this conduit. Each of valves 46 and 54 is preferably provided with two wall apertures, and the valves are actuated at half engine speed from cam shaft 62 through suitable link mechanism.

The rotary valve 50 which controls admission of air to compressor 30 has been illustrated as provided with four equally spaced wall apertures which are brought into and out of register with corresponding apertures 48 in the compressor walls as the valve is rotated. This valve is also a hollow cylindrical valve rotatably journaled on the lower cylindrical compressor walls. The valve 50 is operated at one-quarter engine speed from the cam shaft 62 through suitable speed reducing connections.

A circular opening 65 (Fig. II) forms a seat for the valve 44, and constitutes the lower end of the displacement compressor 30. Valve 44 is reciprocably mounted in a chamber 66 which is communicably connected with the interior of compressor 30 when the valve is open. Pipe 42 communicably connects the chamber 66 with chamber 47.

Carbureter 26 may be the usual type of float controlled carbureter which supplies fuel from a constant level float chamber to a fuel admission nozzle mounted in the path of air flowing toward the engine intake manifold. A pipe connection 67 is provided between chamber 66 and the top of the float chamber of carbureter 26 to insure that during periods when compressed air is being delivered to the intake manifold of the engine from the compressor 30, a corresponding balancing pressure will be impressed on the fuel in the carbureter float chamber.

When the valve 44 is open, as shown in Fig. II, compressed air is supplied to the intake manifold of the engine 20 from the compressor 30. The valves 64 and 44 are connected for simultaneous actuation by bell crank mechanism which has been illustrated in Fig. I in two positions, shown respectively in full and in dotted lines. When valve 64 is open, valve 44 is closed, and vice-versa. With the valve actuating mechanism in the position illustrated by full lines, the engine is operating with supercharging. The principal elements of the valve actuating mechanism comprise a bell crank 68 having a handle 69, the bell crank being pivotally journaled on a shaft 70 which forms the stem of valve 64. A link 71 flexibly connects the bell crank with a pivotally mounted lever 72. An end 73 of lever 72 reciprocates vertically in contact with the stem of valve 44 (see Fig. II). When the bell crank 69 is swung to its dotted position the end 73 of lever 72 is raised to force valve 44 against its seat, thus permitting the engine to operate without supercharging. The carbureter 26 is supplied with fuel from fuel supply pipe 74, and is provided with a throttle valve at the base of riser 27 controlled by valve actuating mechanism indicated by the number 76 (Fig. II). Thus the engine 20 may be operated with or without supercharging and with various throttle openings.

Each of the hot gas transfer conduits or passages 38 is communicably connected to valve chamber 34 by one of a pair of transfer ports 78. The valves 40 have been shown as mounted in abutting relation for rotation in opposite directions, the valve to the right as viewed in Fig. I rotating counterclockwise while the other valve rotates in clockwise direction. Obviously however, the respective valves may be rotated in the opposite direction to that indicated or both in the same direction. Each of the valves 40 is provided with a central web portion 80 on each side of which are peripheral grooves 82. With the valves in the position shown in Fig. I, the abutting webs 80 form a closure for the Venturi throat end of the compressor 30. Likewise with the valves in this position two lower grooves 82 form communicably connecting passages between the hot exhaust gas transfer ports 78 and the interior of compressor 30, thereby permitting transfer of exhaust gases directly from the engine exhaust manifold into the compressor. Also with the valves in the position shown in Fig. I the central webs 80 form a closure preventing any transfer of hot gas from the engine exhaust manifold and passages 38 to ports 39 and aspirator nozzles 36 in the pump discharge pipe 35.

With the valves 40 rotated 90° from the position shown in Fig. I to the position shown in Fig. VIII, the central webs 80 interrupt communication between transfer ports 78 and the interior of the compresser 30, while at the same time opening communication through grooves 82 between ports 78 and ports 39, thus feeding the hot exhaust gases from the engine to the aspirator nozzles 36. Likewise with the valves 40 in the position illustrated in Fig. VIII the central webs 80 no longer close the Venturi throat 32; rather this throat is open through the grooves 82 in the valves to permit discharge of gas from the pump 30 under the suction produced by the operation of the aspirator nozzles 36.

With the valves 40 in the position illustrated in Fig. IX, the central webs 80 completely close off ports 78, there being no further discharge of gas from the engine. During this period of the operating cycle atmospheric air is supplied to the intake manifold of the engine by valve 54. In that portion of the operating cycle which is illustrated in Fig. VIII, on the other hand, the compressor may be scavenged by admission of atmospheric air to the compressor through valve 50 as illustrated. Valves 40 are preferably actuated in timed relation from the engine at half engine speed from cam shaft 62 through suitable connecting link mechanism which has been illustrated.

The valves 40 are preferably so proportioned and mounted with respect to the Venturi throat 32 of the compressor and with respect to the areas and spacing of the hot gas transfer passages 78 and 39, that on rotation of the valves transfer of hot gas from the exhausting engine cylinder to the aspirator nozzles 36 begins substantially at the instant that the valves operate to cut off transfer of hot engine gases to the pump 30 and to open the Venturi throat for expansion exhaust of gas from the pump to atmosphere through the discharge funnel 35 (Fig. VII). The above construction is preferred in order that there may be no substantial interruption of discharge of gas from the engine cylinders during the puff and stroke periods of the exhaust cycle, and that the period of compression and air delivery is followed immediately in the compresor by the period of expansion discharge and scavenging.

The complete operating cycle for the apparatus assembly illustrated by Figs. I to IX inclusive will now be briefly outlined by reference to these figures and to Fig. XI.

According to the preferred operating cycle, one engine exhaust valve (i. e. valve 58 of cylinder 2 of the engine shown in Fig. VII) opens about 45° before bottom dead center position of the piston on its working or power stroke (see Figs. XI and XIII). During approximately the first 90° crank angle movement of the piston in the exhausting cylinder beyond the point of its travel where the exhaust valve opens, the pressure in the exhausting cylinder drops rapidly from an initial pressure of about 60 pounds per square inch absolute to about 25 pounds per square inch absolute, along the dot-dash line 7 of Fig. XI. If during this period the engine is not connected to the supercharger (i. e. with butterfly valve 64 open and compressor valve 44 closed) exhaust gases discharge from the cylinder into the exhaust manifold and thence into a muffler or exhaust pipe from which they exit without substantial interference to atmosphere. With the engine discharging through a muffler to atmosphere, a regular full throttle wave travels through the exhaust manifold and muffler following substantially the dotted curve 8 of Fig. XI. The peak of the curve 8 represents the peak pressure developed by the initial puff discharge wave when the piston is passing through approximately its bottom dead center position. The characteristics of the curve 8 as to its length, shape and height, depend largely on the speed of the engine, the pressure inside of the cylinder at the end of the expansion or power stroke, and the character of the valve lift curve. The second and minor peak in the regular full throttle discharge wave 8 takes place during the secondary or stroke exhaust period of the exhausting cylinder in front of the upward stroke of the piston, the peak pressure substantially coinciding with the period of maximum rate of piston travel at substantially the mid point of the forward stroke, i. e., at substantially 270° crank angle.

When the engine is operatively connected to the supercharger by closing valve 64 and opening valve 44, the exhaust gases are transferred from the engine exhaust manifold to the compressor 30 by having the twin rotary valves 40 in the hot gas transfer position illustrated in Fig. I at the instant that the exhaust valve (i. e. valve 58 of cylinder 2, Fig. VII) opens. With the puff exhaust gas discharge wave 7 transmitted from the engine cylinder to the air trapped in the compressor 30 (air transfer valve 46 being closed) the gas pressure within the compressor 30 builds up along the curve 9 of Fig. XI. Slightly ahead of the time that the piston in the exhausting cylinder passes through its bottom dead center position during the gas exhaust period, the atmospheric air intake valve 54 closes and compressed air transfer valve 46 opens to permit transfer of compressed air from the compressor 30 through the carbureter and intake manifold into another cylinder 5 of the engine, wherein the piston is just starting its compression stroke approaching the end of the air intake period. As the piston in the air intaking cylinder reaches a point in its travel about 45–60° crank angle beyond bottom dead center position on the compression stroke, the air intake valve 56 of cylinder 5 closes. During this period of transfer of air from the compressor to the cylinder 5, substantially the entire original air charge for the compressor is discharged under substantially peak pressure (running as high as 5 to 10 pounds gauge pressure) impressed thereon by the puff exhaust wave from another exhausting cylinder 2 of the engine. At the instant that the intake valve 56 of cylinder 5 closes (period 11 of Fig. XI) the twin valves 40 controlling admission of exhaust gas to the compressor 30 have rotated to approximately the position shown in Fig. VII, cutting off further supply of hot gas from the exhausting cylinder 2 to the compressor, and opening the exhaust throat 32 of the compressor to permit discharge of gas from the compressor to atmosphere through the exhaust funnel 35 under the force of gas re-expansion within the compressor between points 11—12 of Fig. XI. As the twin valves 40 continue to rotate from the position shown in Fig. VII to the position shown in Fig. VIII, the expansion discharge of gases from the compressor is assisted and followed by the suction developed by the final transfer of exhaust gases continuing to discharge from cylinder 2 during the stroke portion of the exhaust to the aspirator nozzles 36. The suction developed by the aspirator nozzles 36 in the pipe 35 reduces the pressure within the compressor 30 below atmospheric along that portion of the curve 9 between the points 12 and 13 of Fig. XI. During this period 12—13 of the pressure curve 9 in the operating cycle of the compressor, the atmospheric air inlet valve 50 opens (see Fig. VIII) permitting influx of fresh atmospheric air to the compressor and scavenging of the compressor with air preparatory to the operation of the compressor on another cycle.

It is not a necessary feature of the invention that the compressor scavenging operation include the development of suction by means of an aspirator, or the supply of scavenging air at atmospheric pressure. Thus scavenging and recharging of the compressor 30 may be readily effected without the air of the aspirator nozzles 36, by supplying air to the air intake valve 50 of the compressor under positive pressure, as by means of a fan or blower. Scavenging with air also takes place by reason of the inertia effects produced by a secondary expansion discharge of the gases past the Venturi throat 32.

When only a single engine cylinder is operatively connected to the compressor 30, the compressor cycle would have a long period of idling extending substantially from point 13 to point 14 on the curve 9 of Fig. XI. This is because only one puff exhaust wave is delivered by a single four-cycle engine cylinder during each two revolutions of the engine. Obviously, therefore, as shown by Figs. XII, XIV and XV, one displacement compressor 30 may be efficiently operated on energy derived from pressure exhaust waves discharged successively from as many as three or four cylinders of a four-cycle engine, when the pistons in the respective cylinders are operating on working strokes which are sequentially phased by crank angle spacings not substantially less than 180°. The number of cylinders which can be operated with a single compressor depends entirely on the time required for one complete pump cycle (10—11—12—13 of Fig. XI).

Since a complete exhaust period of one engine cylinder usually extends over substantially 240° crank angle (period 10—13 of Fig. XII) it would seem that not more than three exhausting cylinders may be successively linked to a compressor such as 30 of Fig. I during two engine revolutions.

In Fig. XII linear diagrams of corresponding parts of the exhaust periods of two exhausting cylinders phased 360° apart and operatively connected with a supercharger (Figs. I–IX) have been laid out along the top line. In this case the latter part of the puff period of the exhaust is somewhat retarded and is approximately measured between the points 11 and 12 on the diagram, while the stroke period of the exhaust is similarly measured by the period 12—13. The curve 15 measures the length of the available scavenging period 12—13 of the compressor cycle when 2, 3, and 4 engine cylinders are operatively connected with a single displacement compressor 30. Evidently a single displacement compressor 30 can be readily operated in cyclic phase on the gas discharges of three cylinders of a four-cycle engine, utilizing the stroke exhaust period of the exhausting cylinder to its fullest possible extent.

With the 2 cylinder hook-up there is a compression idling period between 13 and 10', the equivalent of another half exhaust period, and two of such idling periods add up to a full compression cycle period which can be utilized by connecting a third cylinder to the compressor. However, curve 15 indicates that when an attempt is made to operate the compressor on the discharges of four cylinders of the engine in sequential phase, then the scavenging periods of the compressor appear to be shortened by 50%. Nevertheless it has been found that a single displacement compressor can be operated on the sequential gas discharges from four cylinders of a four cycle engine. By reference to Fig. XI it will be noted that the peak of the pressure wave 9 occurs about 90° crank angle beyond the point at which the exhaust valve opens. However, the first part of the curved line adjacent point 10 rises very slowly, and it is therefore possible to shorten the application to supercharging of the exhaust pressure wave to substantially a 50° crank angle movement of the piston in the exhausting cylinder of an engine running at 1200 R. P. M., without sacrificing any substantial energy conversion in the compressor operation. By thus shortening the puff compression period of the compressor cycle, it is possible to stretch the available scavenging period 12—13 to at least a substantially 90° crank angle movement of the piston in the discharging cylinder, thereby encompassing the complete operating cycle of the compressor on the gas from one discharging cylinder within an interval of 180° crank angle movement.

However, when it is desired to apply the displacement compressor of the present engine to a four-cycle engine having six cylinders, it is necessary to employ two displacement compressors each operating on the sequential gas exhausts from three cylinders. This is shown diagrammatically in Figs. XIV and XV, in which one compressor operates on the sequential gas exhausts of cylinders 1, 3 and 2 and supplies compressed air at the end of the intake stroke sequentially to the cylinders 6, 4, and 5. A second compressor operates on sequential gas exhausts from cylinders 4, 5, and 6, and supplies compressed air sequentially at the ends of the intake strokes to cylinders 3, 2, and 1.

In the concentric polar diagram of Fig. XIII, points 10—11 on the diagram of the exhausting cylinder measure the major span of the puff portion of the exhaust period (these points in the corresponding linear diagram having like numbers in Figs. XI and XII). Between points 11—12 of Figs. XI and XII the gases in the engine cylinder undergo a final puff expansion while the gases inside the compressor undergo a secondary puff expansion to atmosphere. Points 12—13 on the exhausting cylinder curve measure approximately the span of the stroke portion of the exhaust period left for scavenging. The entire exhausting period extends over a 240° crank angle movement. The exhaust valve opens substantially 45° before bottom dead center and closes substantially 15° after top dead center. Of the whole stroke period of the exhaust, 12—13 therefore covers approximately 120° crank angle.

As shown by the inner concentric polar diagram of Fig. XIII the air intake period of the usual internal combustion cylinder normally starts at point 16 on the curve about 10° after the piston has passed top dead center position at the start of its intake stroke. The intake period normally extends over substantially 215° crank angle movement of the piston, with the intake valve closing at point 18 about 45° crank angle movement of the piston beyond bottom dead center at the beginning of its compression stroke.

In the practice of the present invention, air is introduced to the cylinder directly from atmosphere during the first part of the intake stroke extending over substantially 125° crank angle movement of the piston, measured by the arc 16—17 in the diagram of Fig. XIII, while during that portion of the intake period, measured by the 90° of crank angle movement 17—18 of the piston, compressed air is charged to the cylinder. That portion of the intake period 17—18 is substantially identical in phase with the puff period 10—11 of the exhausting cylinder with which the compressor is operatively connected. The period of overlap between the puff exhaust period of one cylinder (for example 2) of a six-cylinder, four cycle engine, with the latter part of the air intake period 17—18 of a corresponding cylinder (for example 5) operating at 360° crank angle phase, may be shortened or lengthened by adjusting the time of opening the exhausting cylinder discharge valve and the intake valve of the air intaking cylinder at the beginning of its compression stroke. Thus the supercharging period may be varied to insure efficient operation of the displacement compressor element of the present invention for utilizing the energy derived from the exhaust gases efficiently in compressing air and delivering such air to the cylinder operating in phase on the last portion of its intake stroke.

The apparatus assembly illustrated in Fig. X has been included to illustrate application of a modified arrangement of internal combustion engine and displacement compressor for compressing air for a purpose which is not necessarily connected with engine supercharging. In the apparatus of Fig. X the displacement compressor 30 has sufficient capacity to effect the compression of a considerable volume of air by energy derived from the exhaust gases discharged from the cylinders of engine 20 over a period of several discharge cycles, or lasting several seconds. In the arrangement illustrated, the exhaust gas discharged from all of the cylinders of engine 20 over a predetermined period is conducted from the exhaust manifold 22 through a transfer pipe 38 into a distributing chamber 88 located at one end of the compressor 30. The gases enter the compressor chamber through a baffle 89 which is arranged to distribute the incoming gas uniformly and without turbulence into the gas inlet end of the compressor. During the period of hot gas transfer from the engine to the compressor a valve 87, located at the inlet end of transfer pipe 38, is held open, while a valve 90 keeps an exhaust pipe 93 closed. Air compressed in the compresser 30 by the pressure exhaust gases admitted past the baffle 89, is conducted through a transfer pipe 42 into compressed air storage tank 85 past a check valve 86. After all of the air originally present in the compressor has been displaced by the engine exhaust gases, valve 87 is closed and a valve 91 is opened, thereby directing exhaust gases from manifold 22 to an aspirator pressure nozzle 36. At the same time the valve 90 in exhaust pipe 93 is opened, permitting hot gases trapped within the compressor 30 to expand and discharge to atmosphere through a discharge funnel 35. The removal of gas from compressor 30 and the expansion down to atmospheric pressure is promoted by the operation of the aspirator jet 36. In fact the aspirator jet operates to finally develop suction or subatmospheric pressure in compressor 30, thereby promoting scavenging of the compressor with a fresh supply of air admitted from atmosphere through a spring controlled check valve 92. After the compressor has been scavenged and filled up with a fresh charge of air at atmospheric pressure, valves 90, 91 are closed and valve 87 is opened preparatory to repeating the cycle previously described.

Having thus described the invention in its preferred form, what is claimed as new is:

1. In compressing and pumping air, the steps comprising trapping a body of air in a chamber at substantially atmospheric pressure, introducing a controlled volume of gas under pressure into one end of said chamber thereby displacing the air from the gas inlet end of the chamber and compressing the air to a balancing pressure while preventing substantial intermixing of the air and gas and while trapping the gas against escape, discharging the compressed air from the chamber while filling the chamber with gas, developing a partial vacuum by discharging another portion of the gas in a high velocity expanding column, and utilizing the partial vacuum to induce discharge of gas from the chamber by aspiration and to scavenge the chamber with a new supply of air at atmospheric pressure before repeating the cycle.

2. In an energy conversion operation, the steps comprising trapping a body of cold gas in an elongated compression chamber at substantially atmospheric pressure, transferring hot gaseous products of combustion under pressure from a four cycle internal combustion engine cylinder directly into one end of said chamber during the first puff portion only of the gas exhausting period in which said products are discharged from said cylinder, displacing the cold gas with the hot gas at the hot gas inlet end of the chamber and thereby compressing the cold gas to a balancing pressure while preventing substantial intermixing of the cold gas and hot gas, discharging the compressed cold gas from the other end of the chamber in a flowing stream while filling the chamber with the hot gas and trapping it against escape, conducting the cold gas stream thus discharged directly to another power developing zone, and during the stroke portion of the cylinder gas exhausting period scavenging the chamber with a new supply of cold gas at substantially atmospheric pressure before repeating the cycle.

3. In an energy conversion operation, the steps comprising trapping a body of cold gas in an elongated pressure chamber at substantially atmospheric pressure, introducing a controlled volume of hot gas under pressure into one end of said chamber, thereby displacing the cold gas from the hot gas inlet end of the chamber and compressing the cold gas while trapping the hot gas against escape from the chamber, discharging the compressed cold gas from the other end of the chamber while filling the chamber with the hot gas, developing a partial vacuum by discharging another portion of the hot gas in a high velocity expanding column, and utilizing the partial vacuum to induce discharge of hot gas from the chamber by aspiration and to scavenge the chamber with a new supply of cold gas before repeating the cycle.

4. In an energy conversion operation, the steps comprising trapping a body of air in a chamber at substantially atmospheric pressure, transferring into one end of the chamber hot gaseous products of combustion under pressure directly from the exhaust port of one cylinder of a multi-cylinder four stroke cycle internal combustion engine during the first puff portion of the gas exhausting period, displacing the air with the hot gas thereby compressing the air while avoiding substantial intermixing of the air and gas and while trapping the hot gas against escape from the chamber, discharging compressed air from the chamber filling the chamber with the hot gas, introducing the compressed air as supercharge air into another engine cylinder during its air intake period, and releasing the hot gas to atmosphere and scavenging the chamber with a new supply of air before repeating the cycle.

5. In an energy conversion operation, the steps comprising trapping within a chamber at substantially atmospheric pressure a body of cold air, discharging waste combustion gases from one cylinder of a four cycle internal combustion engine during the exhaust period of the cylinder cycle, transferring the first high pressure puff portion of the exhaust gas discharge directly from the engine cylinder into one end of the chamber in direct contact with the cold air, thereby displacing the air and forcing it into the opposite end of the chamber while holding the hot gas and cold air in substantially distinct non-turbulent contacting layers and while trapping the hot gas against escape from the chamber, discharging the compressed cold air from the chamber while filling the vessel with the hot gas, and during the stroke portion of the exhaust period developing a partial vacuum by discharging the stroke exhaust gas from the engine cylinder in a high velocity expanding column, and utilizing the partial vacuum to aspirate the expanded puff exhaust gas from the chamber and to scavenge the chamber with a fresh charge of atmospheric air.

6. In an energy conversion operation as initiated in two combustion zones of a multi-cylinder four cycle internal combustion engine, the steps comprising introducing air from atmosphere into one combustion zone during the first part of its intake period, supercharging compressed air into the said zone during the last part of its intake period, simultaneously with the supercharging operation in the first combustion zone discharging exhaust combustion gases from the second combustion zone, trapping a body of air in an elongated chamber at substantially atmospheric pressure, introducing the combustion gases discharged under pressure from the second combustion zone during the first part of the exhaust period into one end of said chamber, thereby displacing and compressing the air therein, transferring the compressed air from the other end of the chamber into the first combustion zone during the supercharging period therein, and utilizing the kinetic energy of exhaust gases discharged from the second combustion zone during the last portion of its exhaust period as an aspirator agent for exhausting expanded combustion gases from the chamber and for scavenging the chamber directly to atmosphere with a fresh charge of air preliminary to a new cycle.

7. In energy conversion apparatus, an internal combustion engine cylinder, a piston reciprocably mounted therein, a valved gas exhaust port for the cylinder, a displacement pump comprising an elongated chamber, a hot gas transfer conduit arranged to conduct gas without substantial pressure drop between the cylinder exhaust port and one end of the pump, a hot gas discharge outlet for the pump ported out of the same end of the pump, valve mechanism arranged to alternately and periodically connect the pump with the hot gas transfer conduit and with the hot gas discharge outlet, actuating and timing means connecting the engine and the valve mechanism, a valved air discharge outlet ported out of the other end of the pump, and a valved air inlet opening from atmosphere directly into the last named end of the pump.

8. In energy conversion apparatus, a four cycle internal combustion engine having a plurality of cylinders with pistons mounted therein, each cylinder having a valved gas exhaust port, an exhaust manifold communicably connected with the exhaust ports of cylinders the operating cycles of which follow each other in sequence with a crank angle spacing of at least 180°, a displacement pump comprising an elongated walled chamber, a short conduit communicably connecting said engine exhaust manifold with one end of the pump, a gas discharge outlet ported out at the same end of the pump, valve mechanism mounted to control communication between the pump and the conduit and between the pump and the gas discharge outlet, a valved atmospheric air inlet ported out in the opposite end of the pump, and a valved pressure air discharge outlet ported out from the end of the pump last referred to.

9. In energy conversion apparatus, an internal combustion engine having a plurality of cylinders and pistons reciprocably mounted therein, a valved gas exhaust port for each cylinder, a plurality of engine exhaust manifolds each communicably connected with the exhaust ports of cylinders the pistons in which reciprocate in sequence with a crank angle spacing of at least 180°, a plurality of displacement pumps each comprising an elongated chamber, conduits communicably connecting each engine exhaust manifold with an end of one of the pumps, a gas discharge outlet ported out of each pump at the said end thereof, and valves mounted to control communication between the interior of each pump and the corresponding engine exhaust manifold and pump discharge outlet, each pump having at its opposite end a valved atmospheric air intake and a valved compressed air discharge outlet.

10. In energy conversion apparatus, a multi-cylinder four cycle internal combustion engine, a valved gas exhaust port and a valved air intake port for each cylinder, an exhaust manifold communicably connected with the exhaust ports of cylinders the operating cycles of which follow each other in sequence with a crank angle spacing of at least 180°, an intake manifold communicably connected with the intake ports of cylinders having operating cycles each of which is 360° apart in phase with respect to the cycle of a cylinder connected with the exhaust manifold, a displacement air pump comprising an elongated chamber, a conduit communicably connecting the engine exhaust manifold with one end of said pump, a gas discharge outlet ported out at the same end of the pump, valve mechanism arranged for periodically switching communication between the pump and the exhaust manifold and pump gas discharge outlet, respectively, a valved atmospheric air intake at the other end of the pump, and a valved compressed air transfer connection between the end of the pump last mentioned and engine intake manifold.

11. In energy conversion apparatus, an internal combustion engine having a pair of cylinders each having a piston mounted for reciprocation therein, said cylinders being timed for operation on power strokes with a 360° crank angle spacing an exhaust gas manifold communicably connected to one of said cylinders and an air intake manifold communicably connected to the other cylinder, a displacement air pump comprising an elongated chamber, a pair of valved conduits communicably connecting the ends of the pump respectively with the engine exhaust manifold and with the engine air intake manifold, a valved atmospheric air intake ported out in the air discharge end of the pump, and a valved exhaust gas discharge outlet ported out of the exhaust gas intake end of the pump.

12. Apparatus as defined in claim 11, together with an aspirator having a pressure nozzle operatively connected with the pump gas discharge outlet, a passage communicably connecting the nozzle of the aspirator with the engine exhaust manifold, and valve mechanism for controlling communication between the pump and the engine exhaust manifold, and between said exhaust manifold and the aspirator nozzle.

13. In energy conversion apparatus, an internal combustion engine cylinder having a piston reciprocably mounted therein, an exhaust manifold connected with said cylinder, a displacement pump comprising an elongated chamber having a throat at one end thereof, a conduit communicably connecting said throat with the exhaust manifold, an extension of said pump beyond said throat forming a gas discharge outlet from the pump, valve mechanism rotatably mounted in said throat for periodically switching communication between the pump and the exhaust manifold and pump discharge outlet respectively, and an atmospheric air intake and a compressed air discharge outlet both ported in the end of the pump opposite the throat.

14. Apparatus as defined in claim 10, together with valve mechanism arranged for switching the engine during each air intake period between atmospheric air intake and compressed air supercharging.

15. In energy conversion apparatus, an internal combustion engine cylinder, a piston reciprocably mounted therein, a valved gas exhaust port for the cylinder, a displacement pump consisting of an elongated walled chamber, a hot gas intake port and a separate hot gas discharge port at one end of said chamber, a cold gas discharge port and a cold gas intake port at the opposite end of said chamber, a conduit connecting the hot gas intake port of the pump with the cylinder exhaust port, valves for controlling each of said gas intake and gas discharge ports, means arranged to periodically develop a partial vacuum within said chamber, and actuating and timing mechanism for operating the valves and vacuum developing means.

16. In an energy conversion operation the steps comprising, successively exploding combustible charges of compressed air and fuel alternately within two combustion zones at rapidly repeated intervals, converting part of the energy developed by each explosion to mechanical energy within the combustion zone, transferring a wave of hot waste gaseous products of combustion from each explosion still under low superatmospheric pressure into one end of a compression chamber filled with a charge of air to be compressed, thereby displacing the air and compressing it into the other end of the chamber by a pressure balancing operation while preventing substantial intermixing of the air and gas and while trapping the gas against escape from the chamber, transferring the charge of compressed air as supercharge air directly from the chamber to that one of the combustion zones in which the next explosion is to take place, expanding the hot gas within the chamber down to atmospheric pressure by rapid and direct release to atmosphere, and scavenging the chamber with a new supply of air before repeating the cycle.

17. The process as defined in claim 4 in which supercharge air is introduced to the second engine cylinder only during the last part of the air intake period, and during the first part of the intake period of said cylinder air is introduced thereto from atmosphere.

18. In an energy conversion operation the steps comprising, trapping a body of air in a displacement chamber at low pressure, transferring a high pressure gas wave directly from the exhaust port of an internal combustion engine cylinder into one end of said chamber during the first puff period of gas exhaust from said cylinder thereby compressing the air by pressure balancing displacement while avoiding substantial intermixing of the air and gas, discharging the body of compressed air from the other end of the chamber ahead of the advancing gas wave and transferring the compressed air as a moving body directly as supercharge air into another engine cylinder during its air intake period while filling the chamber with the hot gas and trapping the gas against escape, and at the end of the puff exhaust period expanding exhaust gas remaining in the first engine cylinder and that trapped in the chamber directly to atmosphere and scavenging the chamber with a fresh supply of air preliminary to a new cycle.

19. In energy conversion apparatus, an internal combustion engine having operatively paired cylinders each having a piston mounted for reciprocation therein, said cylinders being timed for operation in sequence with the first part of the gas exhaust period of one cylinder coinciding with the last part of the air intake period of the other cylinder, an exhaust port and an air intake port for each cylinder, a displacement pump comprising a walled chamber, a pair of conduits connecting opposite ends of the chamber respectively with an intake port of one cylinder and with an exhaust port of the other cylinder, a scavenging air intake port and an exhaust gas discharge port at opposite ends of the chamber, and valve mechanism arranged for actuation and timing by the engine to communicably connect the cylinders through said conduits and displacement pump at one period of the pump cycle coinciding with the first part of a cylinder gas exhaust period, and to block communication between the cylinders and pump and simultaneously open the pump gas discharge and air intake ports for pump scavenging at a later period of the cycle.

JOHANN J. WYDLER.
ROBERT G. GRISWOLD.

CERTIFICATE OF CORRECTION.

Patent No. 2,284,732. June 2, 1942.

ROBERT G. GRISWOLD, ET AL.

It is hereby certified that error appears in the printed specification of the above numbered patent requiring correction as follows: Page 7, second column, lines 32 and 33, for "chamber and for scavenging the chamber directly to atmosphere with" read --chamber directly to atmosphere and for scavenging the chamber with--; and that the said Letters Patent should be read with this correction therein that the same may conform to the record of the case in the Patent Office.

Signed and sealed this 27th day of October, A. D. 1942.

Henry Van Arsdale,
Acting Commissioner of Patents.

(Seal)